United States Patent Office

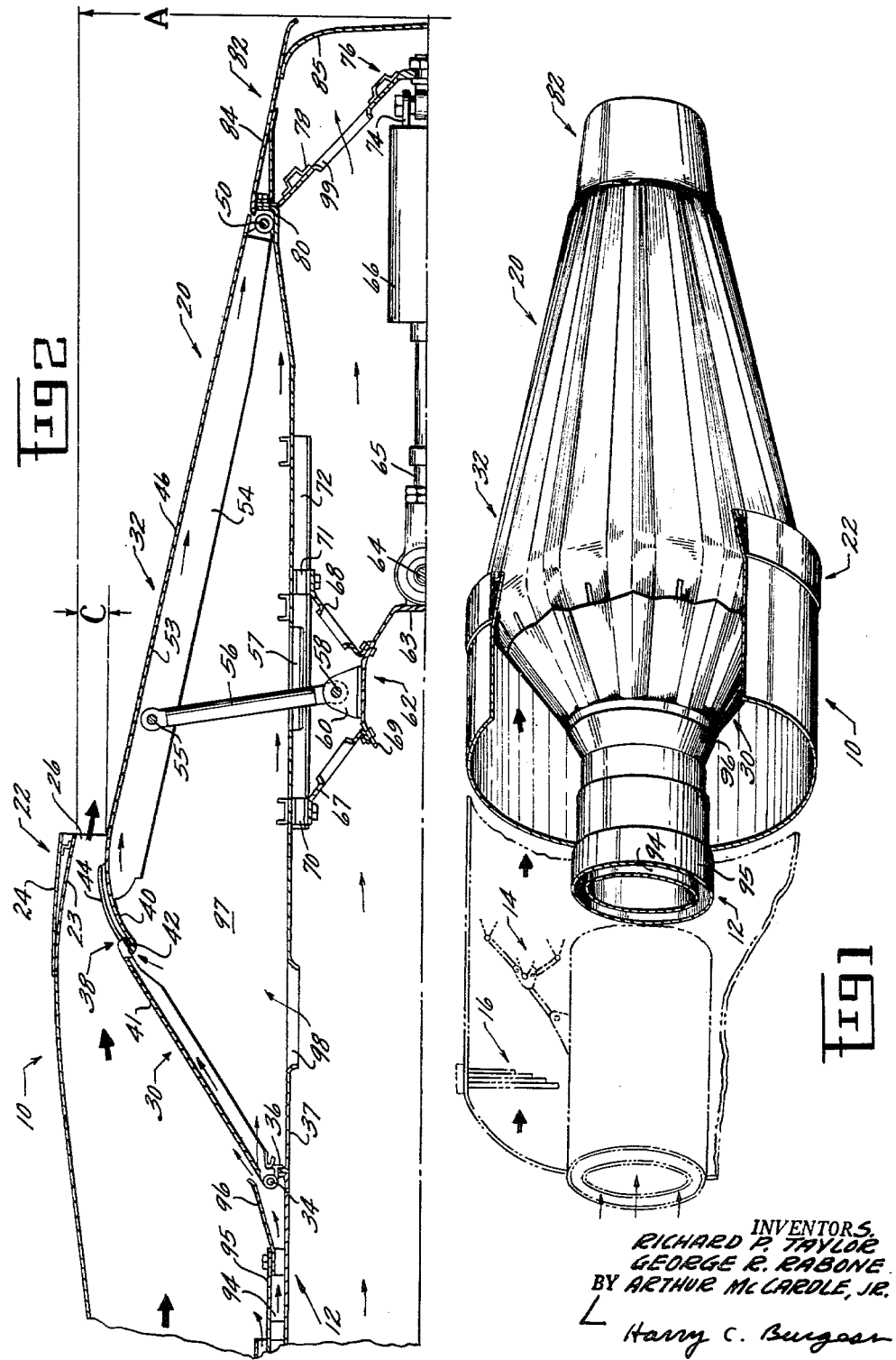

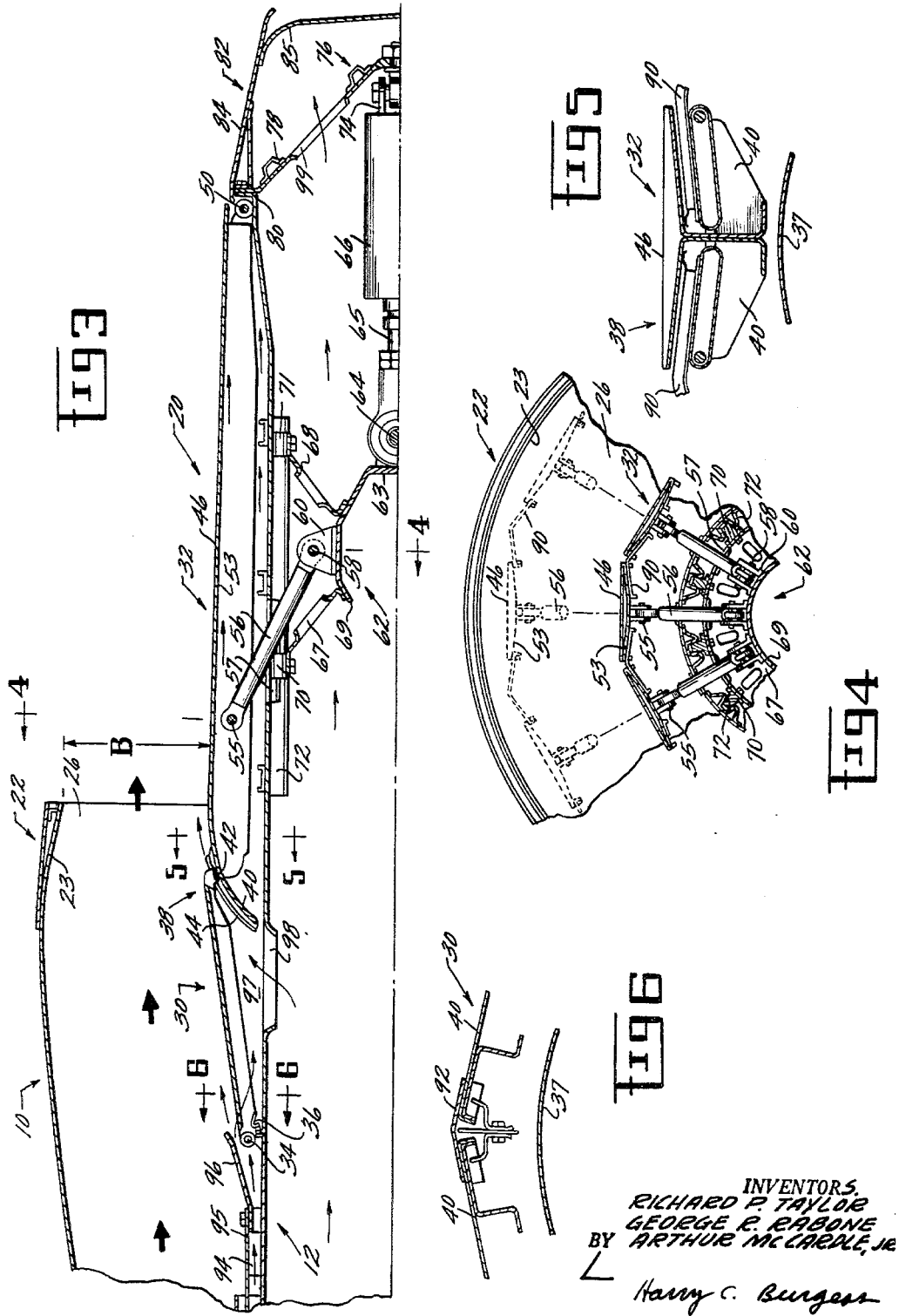

3,237,864
Patented Mar. 1, 1966

3,237,864
LOW DRAG VARIABLE PLUG JET EXHAUST NOZZLE
Richard P. Taylor, George R. Rabone, and Arthur Mc-
Cardle, Jr., Cincinnati, Ohio, assignors to General Electric Company, a corporation of New York
Filed Dec. 3, 1962, Ser. No. 241,586
6 Claims. (Cl. 239—127.3)

This invention relates to an exhaust nozzle for jet engine propelled aircraft, and more particularly, to a low drag exhaust nozzle for jet engine propelled aircraft capable of flight at subsonic and supersonic speeds, the nozzle having a variable diameter inner member for adjusting the nozzle throat area in accordance with changes in the aircraft flight speed and engine cycle requirements.

More and more interest in being shown in improved powerplants for high-Mach supersonic aircraft, for example, turbo-ramjet, pure ramjet, and turbo-rocket-ramjet engines. These engines have recently become the subject of intensive studies aimed at providing means whereby engine operating efficiency may be optimized under dissimilar fight conditions. Certain of these studies have concerned the jet exhaust nozzle design. While it is known that for subsonic operation an efficient type of jet exhaust nozzle is one having a convergent shape, at transonic and supersonic speeds it is more desirable to employ an exhaust nozzle having a convergent portion followed by a divergent portion. In supersonic aircraft where a wide range of nozzle pressure ratios are likely to be encountered, it is also desirable to arrange to vary the minimum flow area, or throat, of the convergent portion of the nozzle and the nozzle exit area at the downstream end of the divergent portion in order to maintain high performance under all operating conditions. This is especially desirable when the engine utilizes a system of thrust augmentation, for example, afterburning, wherein fuel is injected and burned downstream of the turbine area with the resulting further expansion of the combustible gases. In addition to afterburning by means of injecting fuel in the exhaust duct of the engine, thrust augmentation may also be achieved by a well-known type of turbojet engine known as the turbofan. In this engine embodiment an auxiliary fan or large bladed rotor is mounted either at the front of the engine or at the rear to be acted upon by a free, or bypass stream of air which may or may not include means for injecting fuel therein. Several convergent-divergent nozzles which have been proposed for such engines have utilized movable members, such as sets of flaps or fingers, capable of varying the effective areas of the nozzle convergent and divergent portions. However, one of the problems associated with such engine and nozzle combinations has been the need for reduction of so-called "afterbody drag," which may be defined as the disturbance in airflow around the rear end of an installed engine partially caused by necessary engine exhaust nozzle components such as, for example, flaps and flap actuation means, which extend outwardly or protrude into the free flow airstream. While it is clearly advantageous to keep the maximum nozzle diameter at a minimum to decrease afterbody drag, this may be difficult particularly in the turbofan configuration wherein the maximum diameter of the engine is necessarily relatively large. Considered from another standpoint, the problem must take into account the fact that when an afterburning engine is required to cruise normally, i.e., cruise dry or without augmentation at flight speeds and power settings which produce relatively low jet exhaust nozzle pressure ratios, the effects of afterbody drag are more severe. This is even more true in the case of the turbofan type of engine operating at subsonic and transonic flight speeds since, under these conditions, the jet exhaust area is considerably smaller than the maximum nozzle cross-sectional area. The difference between these areas, known as the unused nozzle area, must be treated in such a manner that the highest possible value of engine thrust-minus-afterbody drag is obtained. To achieve minimum external drag on the nozzle two typical dimensions may be treated. These are (1) the nozzle maximum cross-sectional area and (2) the nozzle afterbody length. If, first of all, nozzle maximum cross-sectional area is kept as small as possible, the potential drag surface (i.e., the unused nozzle area) will be at a minimum and, if secondly, the ratio of the axial length of the nozzle to its maximum diameter—known as the "fineness ratio"—is maximized, aerodynamic drag can be further lowered.

Previous means for treating these and other problems related to engine and, more specifically, nozzle performance, i.e., efficiency, have included besides the aforementioned convergent-divergent variable flap nozzle, the conventional plug-type nozzle. All of these attempts have proved to be something less than completely desirable, however, especially in the areas of installed nozzle thrust-minus-afterbody drag in all operational flight modes, and in the manner in which the nozzle throat area is adjusted to provide optimum engine control and afterburning capability, i.e., good internal performance. Part of the problem has concerned the inability of previous plug-type nozzles, in particular, to provide a maximum amount of nozzle throat area variation. A related problem has concerned the desirability of keeping the nozzle threat area, in such nozzles, in a relatively constant plane of reference with respect to the nozzle axis to provide increased control stability. Further, plug-type nozzles, especially in afterburning engines, pose significant cooling problems. Thus, it would be particularly advantageous to have a low drag, variable plug nozzle capable of efficient performance during all flight modes in aircraft engines utilizing thrust augmentation means. It would also be of further benefit in military applications if the natural ability of the plug to block infrared radiation of the hot engine parts were to be enhanced.

Accordingly, a general object of the present invention is to provide an improved jet exhaust nozzle having a minimum total installed loss of thrust due to external afterbody drag and maximum internal performance—efficiency—under all operating conditions.

A more specific object of the present invention is to provide an improved plug-type jet exhaust nozzle having minimum projected area for the reduction of potential drag losses and a relatively high fineness ratio for minimum installed operating losses, the nozzle having superior variable throat capability for greater adaptability to engines having thrust augmentation means.

A still further object of the present invention is to provide a jet exhaust nozzle of the plug type having a variable throat area and adapted for use in an engine having thrust augmentation means wherein the nozzle embodies improved infrared suppression capabilities.

In accordance with one embodiment of the invention, there is provided an exhaust nozzle for jet propelled aircraft adapted to fly at subsonic or supersonic speeds, the nozzle including an annular shroud member terminating in an inwardly curved portion having a shallow angle with respect to the nozzle centerline, an inner generally conical member located co-axially with respect to the shroud and forming a throat therewith, the inner member including a plurality of sets of pivotable flaps operable to vary the diameter of the inner member to change the throat area over a significant range of values, and cooling means for the inner conical member which enhances the life of the structural parts of the nozzle and aids in infrared radiation suppression.

It is believed that other objects and many of the attendant advantages presented by our invention will become more apparent and better understood when the following detailed description is read in conjunction with the following drawings, in which:

FIG. 1 is a perspective view, partially cut away, of the nozzle of the present invention located at the rear of a jet engine exhaust duct having thrust augmentation means mounted therein;

FIG. 2 is a partial side view, partially in cross-section of the nozzle of the subject invention illustrating in detail the inner plug member and its internal actuating mechanism for varying the throat area of the nozzle, the nozzle being shown in the subsonic, or non-augmented operating mode;

FIG. 3 is the nozzle of FIGURE 2 shown in the supersonic, or augmented operating mode;

FIG. 4 is a fragmentary view, partially in cross-section, taken along line 4—4 of FIGURE 3;

FIG. 5 is a fragmentary view, partially in cross-section, taken along line 5—5 of FIGURE 3; and FIG. 6 is another fragmentary view, partially in cross-section, taken along line 6—6 of FIGURE 3.

Turning now specifically to FIGURE 1, shown in perspective is an exhaust duct, indicated generally at 10, for a turbojet engine (not shown). Located centrally of the duct is a circular support member, or beam, indicated generally at 12. Mounted on the support member is a flameholder 14, which may be of the type shown and described in the patent to Krabacher et al., 3,056,261 of common assignment. Just upstream of the flameholder are located fuel injection means 16, such as described in the patent to McEneny, 3,002,353, also of common assignment. At the end of the support beam 12 is mounted the inner member, or plug, indicated generally at 20, of our improved nozzle. While shown as installed in a turbojet engine it will be understood that the invention is equally applicable to a turbofan type of engine.

Referring now to FIGURE 2, which is a cross-sectional view of the invention, it will be seen that, in addition to the plug 20, the nozzle comprises an outer annular shroud member indicated generally at 22, having an inwardly curved portion 23 and an outer fairing portion 24. Both the inwardly curved portion and the outer fairing portion terminate in a single plane 26 forming a throat area for the nozzle in combination with the inner plug member, indicated generally at 20. In contrast to known variable area nozzle designs, the present invention provides a more ideal nozzle throat area variation by providing means for changing the diameter of the inner plug member 20 over a relatively large range of throat area values, with a consequent gain in nozzle efficiency over a large range of operating modes. At the same time, the maximum installed diameter, or projected area A of the nozzle, is held to a minimum to cut down on afterbody drag. The described arrangement also increases internal nozzle performance (efficiency), thus maximizing installed thrust, while enhancing the plug's natural capability for infrared radiation suppression. To achieve these desirable results the plug 20 comprises a plurality of sets of pivotable flaps, i.e., a first set of flaps, one of which is indicated generally at 30, upstream of the throat 26 and a second set of flaps, one of which is indicated generally at 32, substantially downstream of the throat. The shorter upstream flaps 30 are hinged at 34 to a circular flange 36 at the downstream end of the beam member 12, i.e., at the juncture of the latter and a central plug beam or support means 37, also of circular cross-section. While the hinge at 34 retains the flaps against the pressure of the gas flow at the flap upstream ends, at the downstream end of each flap 30 is a cam and slider arrangement, indicated generally at 38, which connects the aft end of the shorter flaps to the upstream or forward end 40 of the longer flaps 32. As can be seen in the drawings, the cam and slider arrangement comprises a roller 42 adapted to move in a track 44, the track being located on the exterior surface 46 of the longer flap 32, at the inwardly curved forward end 40. The forward flap ends are preferably curved inwardly to accommodate the shorter length of the flaps 30 and to aid in the distribution of cooling air, as hereinafter described. The longer flaps, in turn, are supported at their aft or downstream ends by hinges 50 mounted on the aft end of the circular plug support beam member 37. The forward portion of the longer flaps 32 and the annular shroud member 22 thus cooperate to form the throat 26 of the nozzle. It will also be realized that the divergent portion of the jet exhaust nozzle is formed by the portion of longer flaps downstream of the nozzle throat, i.e., the converging wall or conical portion of the inner plug member 20.

One of the advantages of our invention concerns the fact that with the sets of movable flaps forming the internal plug it may be possible to locate the flap actuating means internally of the plug and, therefore, aid in afterbody drag reduction. To this end located centrally of each flap 32 and depending from the inner surface 53 thereof is a stiffener member 54 which pivotally attaches at 55—located at the approximate center of pressure on the longer flaps 32—to a link member 56. The link member extends radially inward, passing through an opening or slot 57 into the interior of the beam 37, the other end of the link member being pivotally attached at 58 to a clevis 60 affixed to an annular support member or ring, indicated generally at 62. The annular supporting member 62 may be described as U-shaped, in cross-section, with a base portion 63 facing aft. The base is pivotally attached by means of a pin 64 to a connecting, or actuating rod 65 adapted to be translated parallel to the nozzle axis by motor means 66. To enable the ring member 62 to move axially with the rod 65, sliding support means are provided which, in the described embodiment, take the form of a pair of oppositely diverging conical rings 67 and 68, each rigidly attached at one edge thereof to the sides 69 of the U-shaped member 62. The other edges of the conical rings 67 and 68 are affixed, respectively, to axially spaced slider members 70 and 71, adapted to ride in a track 72 disposed on the interior surface of the beam 37. The motor means, or actuator 66 which may be of the electrical, pneumatic, or hydraulic variety well known in the art, is itself pivotally supported at 74 at its rearward end by a relatively heavy ring member, indicated generally at 76. The ring member 76 is mounted at the extreme aft end of the inner nozzle member 20 and includes an annular portion 78 extending outwardly to adjacent hinge 50 where it is affixed to a flange 80 on the rear end of the support beam 37. An end cap, indicated generally at 82, comprising an outer fairing 84 and a rear baffle member 85 is also provided to seal the aft end of the plug member. While shown as being truncated, the plug member could also converge to a point although in the interest of saving weight the blunted end is preferred.

Thus, it will be realized that the flap members 30 and 32 serve both as structural parts of the inner plug member 20, as well as means for varying the throat area, as seen perhaps more clearly in FIGURES 5 and 6 showing the flaps in cross-section looking transversely of the nozzle. The latter drawings also illustrate the sealing members 90 and 92 provided between the longer and shorter flaps, respectively, for sealing of the spaces between the flaps, particularly, during plug diameter variation. The seals are retained in position by exhaust gas loading and by use of appropriate retention devices, such as are fully described in the patent to Schaefer, 2,969,641, of common assignment. It should also be noted that hinges 34, 50, and 58 are all attached to beam 37 running through the center of the variable diameter inner member 20 which will simplify any problems associated with interaction of the movable flaps and seals and tend to prevent any tendency for binding of the actuating mechanism. In effect, then, the entire nozzle is bolted at flange 36 to the main engine structural frame member 12, as indicated in the drawings, and may be removed as a complete assembly for repair or replacement.

In operation, the proper nozzle throat area 26, which is dependent on the mode of flight, is designed to be automatically achieved and held by the single hydraulic actuator or motor means 66 controlled, for example, by a hydraulic servo system (not shown). The actuator will position the nozzle flaps by driving the ring 62 with a fore and aft motion, the ring serving to both support and position the flaps by means of connecting the links 56, as perhaps more clearly illustrated by a comparison of FIGURES 2 and 3. In FIGURE 2, the nozzle flaps are shown in the open, or subsonic cruise operating mode, which utilizes a minimum throat area, while FIGURE 3 depicts the thrust augmented or afterburning position typical of take-off and high speed supersonic operation, i.e., with a maximum throat area. Although not necessary, by mounting the actuator at the aft end of the plug inspection and actuator removal is made more convenient since the cap 82 may be removed as a unit for easy access.

An additional feature of the invention provides that in the event of hydraulic or actuating power loss the nozzle will move to the minimum throat area position by means of gas loading on the flaps. This is made possible by reason of an internal plug pressurization factor which gives a net differential pressure in the radially outward direction, the pressurization being accomplished together with the unique nozzle infrared suppression and cooling capability, hereinnow described. As stated above, one of the design objectives of the present nozzle configuration was to minimize infrared radiation intensity, particularly in the turbofan application. This feature is provided primarily by the use of film cooling of exposed metal parts to reduce skin temperatures and, secondly, by use of an improved plug nozzle configuration to limit the direct line of sight to the engine combustion and turbine areas. In addition, in the turbofan application mixing of the fan and turbine discharge gases may be utilized, if necessary, to reduce the exhaust jet temperature. Thus, it will be noted that in both the subsonic and supersonic operating modes shown in FIGURES 2 and 3, respectively, film cooling air is provided along the inner and outer surfaces of the plug member flaps 30 and 32. This is accomplished by means of a passage 94 formed by an inner wall provided by the circular member 12 and an outer wall 95 concentric thereto. This passage is connected to a source of cooling air (not shown) which is directed by a divergent flange member 96, attached to the downstream end of wall 95, along the outer surface 41 of the shorter flaps 30 in either operating mode, as seen in FIGURES 2 and 3. In addition, openings between the seals 92 and the shorter flaps 30 are provided adjacent the hinges 34 to enable cooling air to be injected interiorly— at 97—of the plug member 20. Part of this air will flow along the inner surface of the shorter flaps and part outwardly across the cam and slider mechanism 38 for additional cooling, as can be seen by the small arrows in FIGURES 2 and 3. Finally, an additional portion of this air flows along the inner surface 53 of the longer flaps 32. Cooling air is also supplied to the interior of the beam support member 37, through the hollow member 12, which air is directed through openings 98 and 99 into the interior of plug member and end cap, respectively. This additional cooling air flows along the outer surface of the beam member 37, as indicated by the small arrows in the drawing, finally exiting through openings adjacent the rearward hinge 50 of the longer flaps.

Thus, the described nozzle configuration has at least two main advantages: first, it provides film cooling to isolate the flaps and other parts from the hot exhaust gases, which enhances the structural integrity and, hence, the life of the described structural components of the plug nozzle; and, secondly, it accomplishes improved infrared suppression by reducing temperature caused radiation while enhancing the natural capability of the plug-type nozzle for line of sight infrared radiation blockage by maximizing the range of plug diameter variation. Therefore, while it is true that annulus B—in the supersonic or military "dash" configuration shown in FIGURE 3—is greater that annulus C, in the subsonic position shown in FIG. 2, some infrared suppression is still accomplished by increasing the flow of cooling air, although in thrust-augmented aircraft operation infrared radiation from the extensive jet exhaust plume is so high as to override any practical attempt at suppression. In any event, the cooling airflow enhances the structural life of the nozzle parts, particularly the plug flaps and seals.

What we desire to claim is:

1. An axisymmetric exhaust nozzle for jet propelled aircraft adapted to fly at subsonic or supersonic speeds comprising:

a fixed annular shroud member including a cylindrical outer portion and an inner portion, both of said portions terminating downstream in the same plane with respect to the nozzle axis, said outer portion having a shallow angle with respect to the nozzle centerline in order to reduce external drag and said inner portion curving inwardly to turn the exhaust jet toward the nozzle axis;

an inner member coaxially arranged with respect to said shroud member and forming an annular nozzle throat area with said inner portion, said inner member having sets of pivotable flaps which cooperate to vary the nozzle throat area in accordance with varying aircraft operating requirements, said throat area being located axially with respect to the nozzle in said terminating plane during all variations of throat area;

and means for cooling said nozzle including walls forming passages for directing a film of cooling fluid along the outer surfaces of the pivotable flaps of said sets.

2. An axisymmetric exhaust nozzle for jet propelled aircraft adapted to fly at subsonic and supersonic speeds comprising:

a fixed annular shroud member including a cylindrical outer portion and an inner portion, both of said portions terminating downstream in the same plane with respect to the nozzle axis, said outer portion having a shallow angle with respect to the nozzle centerline in order to reduce external drag and said inner portion curving inwardly to turn the exhaust jet toward the nozzle axis;

a generally conical inner member located coaxially with respect to said shroud member and forming an annular nozzle throat area therewith, said inner member including a first set of longitudinally-extending flaps pivotally mounted at their upstream ends, a second set of longitudinally-extending flaps pivotally mounted at their downstream ends, and a plurality of longitudinal seal members intermediate the individual flaps of said first and second sets;

actuation means, said actuation means being operable to move said sets of pivotable flaps to vary said throat area in accordance with the requirements of varying aircraft operating speeds;

and means for cooling said inner member including wall means forming passages for directing a film of cooling fluid along the internal and external surfaces of said flaps.

3. An axisymmetric exhaust nozzle for jet propelled aircraft adapted to fly at subsonic and supersonic speeds comprising:

a fixed annular shroud member including a cylindrical outer portion and an inner portion, both of said portions terminating downstream in the same plane with respect to the nozzle axis, said outer portion having a shallow angle with respect to the nozzle centerline in order to reduce external drag and said inner portion curving inwardly to turn the exhaust jet toward the nozzle axis;

a generally conical inner member located coaxially with respect to said shroud member and forming an annular nozzle throat area therewith, said inner member including a first set of longitudinally-extending flaps pivotally mounted at their upstream ends, a second set of longitudinally-extending flaps pivotally mounted at their downstream ends, and a plurality of longitudinal seal members intermediate the individual flaps of said first and second sets;

means for cooling said inner member including wall means forming passages for directing a film of cooling fluid along the external surfaces of said flaps;

and an actuation mechanism for moving said sets of pivotable flaps, said mechanism being located interiorly of said inner member and being operable to cause the flaps to vary said throat area in accordance with varying aircraft operating requirements, said throat area being located axially with respect to the nozzle in said terminating plane during all variations of said throat area.

4. An axisymmetric exhaust nozzle for jet propelled aircraft adapted to fly at subsonic and supersonic speeds comprising:

an annular shroud member terminating in an inwardly curved portion with respect to the nozzle centerline;

a generally conical inner member located coaxially with respect to said shroud member and forming an annular nozzle throat area therewith, said inner member including a first set of longitudinally-extending flaps pivotally mounted at their upstream ends, a second set of longitudinally-extending flaps pivotally mounted at their downstream ends, and a plurality of longitudinal seal members intermediate the individual flaps of said first and second sets, said first and second sets of flaps being connected together in a slidable, mutually supporting relationship at their respective other ends;

means for cooling said inner member including wall means forming passages for directing a film of cooling fluid along the external surfaces of said flaps;

and an actuation mechanism for moving the flaps of said first and second sets about their respective pivot points, said mechanism comprising a plurality of link members, one end of each member being pivotally attached to the flaps of one of said sets, and a motor means, said motor means being operably connected to the other ends of said link members to cause the ends of said members to move oppositely with respect to the nozzle axis and vary said throat area in accordance with varying aircraft operating requirements, said throat area being located axially with respect to the nozzle in said terminating plane during all variations of said throat area.

5. In an aircraft adapted to fly at subsonic or supersonic speeds:

a jet engine having a duct for entraining the engine exhaust gas stream, said duct terminating in a downstream lip portion;

a centrally fixed hollow beam member extending longitudinally of said duct;

a source of cooling fluid;

a generally conical, hollow, inner member supported at the downstream end of said beam member, said inner member forming an annular jet exhaust nozzle throat area with said duct lip portion and comprising a first set of longitudinally-extending flaps pivotally mounted at their upstream ends on said beam member, a second set of longitudinally-extending flaps pivotally mounted at their downstream ends on said beam member, the flaps of said first and second sets being connected together in a slidable, mutually supporting relationship at their respective other ends, and a plurality of longitudinal seal members intermediate the individual flaps of said first and second sets, said flaps being movable to vary said throat area in response to varying aircraft operating and engine cycle requirements, said throat area being located axially with respect to the nozzle in said terminating plane during all variations of said throat area;

and wall means forming a passage about said beam member, wherein said cooling fluid flows from the interior of said beam member to the interior of said inner member for fluid film-cooling of the inner surfaces of said flaps and the hollow beam member and through said passage and along the exterior surfaces of said first set of flaps, said cooling fluid passing ultimately into said gas stream to enhance the structural life of said inner member and aid in infrared radiation suppression during aircraft operation at subsonic speeds.

6. In an aircraft adapted to fly at subsonic or supersonic speeds:

a jet engine having a duct for entraining the engine exhaust gas stream, said duct comprising a fixed annular shroud member including a cylindrical outer portion and an inner portion, both of said portions terminating downstream in the same plane with respect to the nozzle axis, said outer portion having a shallow angle with respect to the nozzle centerline in order to reduce external drag and said inner portion curving inwardly to turn the exhaust jet toward the nozzle axis;

a centrally fixed hollow beam member extending longitudinally of said duct;

a source of cooling fluid;

a generally conical, hollow, inner member supported at the downstream end of said beam member, said inner member forming an annular jet exhaust nozzle throat area with said duct lip portion and comprising first and second sets of longitudinally-extending flaps, the flaps of each set being pivotally mounted at opposite ends on said beam member, with the flaps of said first set being connected to the flaps of said second set in a slidable, mutually supporting relationship at their respective other ends; and an actuation mechanism located interiorly of said nozzle to minimize aerodynamic drag, said mechanism comprising a plurality of link members and a motor means, one end of each link member being pivotally attached to the flaps of one of said sets, the other ends of said link members being operably connected to said motor means, the ends of said link members being movable by said motor means to pivot said sets of flaps to vary said throat area in accordance with varying aircraft operating requirements, said throat area being located axially with respect to the nozzle in said terminating plane during all variations of said throat area, wherein a first portion of said cooling fluid flows from the interior of said beam member to the interior of said inner member and thence into the gas stream through slots in the inner member adjacent said flap ends, said first portion of fluid film-cooling the inner surfaces of said first set and the exterior surfaces of said second set of flaps and the interior of said hollow beam member, and a second portion of said fluid flows along the exterior surfaces of said beam member and said first set of flaps, said cooling fluid enhancing the structural life of said inner member and aiding in infrared radiation suppression during aircraft operation at subsonic speeds.

References Cited by the Examiner

UNITED STATES PATENTS

| | | | |
|---|---|---|---|
| 2,641,104 | 6/1953 | Estabrook | 60—35.6 |
| 2,788,635 | 4/1957 | Ford | 60—35.6 |
| 2,811,827 | 11/1957 | Kress | 60—35.6 |
| 2,928,235 | 3/1960 | Johnson | 60—35.6 |
| 3,040,523 | 6/1962 | Price | 60—35.6 |
| 3,046,730 | 7/1962 | Petren | 60—35.6 |

FOREIGN PATENTS

| | | |
|---|---|---|
| 677,973 | 8/1952 | Great Britain. |
| 873,173 | 7/1961 | Great Britain. |

MARK NEWMAN, *Primary Examiner.*

ABRAM BLUM, SAMUEL LEVINE, *Examiners.*